US012779694B2

(12) United States Patent
Song et al.

(10) Patent No.: US 12,779,694 B2
(45) Date of Patent: Nov. 3, 2026

(54) FORCE GUIDANCE TELEROBOTIC SYSTEM AND CONTROL METHOD BASED ON DUAL-ARM COLLABORATIVE POTENTIAL FIELD

(71) Applicant: SOUTHEAST UNIVERSITY, Jiangsu (CN)

(72) Inventors: Aiguo Song, Jiangsu (CN); Mutian He, Jiangsu (CN); Jianzhi Wang, Jiangsu (CN); Huijun Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 64 days.

(21) Appl. No.: 19/008,558

(22) Filed: Jan. 2, 2025

(65) Prior Publication Data

US 2025/0269535 A1 Aug. 28, 2025

Related U.S. Application Data

(63) Continuation of application No. PCT/CN2024/081064, filed on Mar. 12, 2024.

(30) Foreign Application Priority Data

Feb. 26, 2024 (CN) ......................... 202410208048.5

(51) Int. Cl.
*B25J 9/16* (2006.01)

(52) U.S. Cl.
CPC ............ *B25J 9/1689* (2013.01); *B25J 9/161* (2013.01); *B25J 9/1676* (2013.01); *B25J 9/1682* (2013.01); *B25J 9/1697* (2013.01)

(58) Field of Classification Search
CPC ...... B25J 9/1676; B25J 9/1689; B25J 13/003; B25J 13/025; B25J 19/023; B25J 9/0084;
(Continued)

(56) References Cited

U.S. PATENT DOCUMENTS

2018/0232052 A1* 8/2018 Chizeck .................. G06F 3/016

FOREIGN PATENT DOCUMENTS

| | | |
|---|---|---|
| CN | 114098981 | 3/2022 |
| CN | 114643576 | 6/2022 |

(Continued)

OTHER PUBLICATIONS

"International Search Report (Form PCT/ISA/210) of PCT/CN2024/081064," mailed on May 4, 2024, pp. 1-4.

(Continued)

*Primary Examiner* — Jerrod Irvin Davis
(74) *Attorney, Agent, or Firm* — JCIPRNET

(57) ABSTRACT

Disclosed are a force guidance telerobotic system and control method based on a dual-arm collaborative potential field. A real-time pose of a tool center point of each of the two robotic arms is obtained using a robotic arm kinematic model, and checking is performed to determine whether a shortest distance $d_{p-s,i}$ between a target object and a workspace boundary of each of the two robotic arms is lower than a threshold $D_s$; a dual-arm symmetric collaboration strategy will be adopted when higher than the threshold; a single-arm primary collaboration strategy will be adopted when lower than the threshold; and a coordination factor $\delta_i$ of each of the robotic arms is determined according to the collaboration strategy; the dual-arm collaborative potential field is constructed according to the collaboration factor, a distance between the target object and the tool center point and a position of obstacle.

8 Claims, 3 Drawing Sheets

(58) Field of Classification Search
CPC ........ B25J 9/161; B25J 9/1633; B25J 9/1682; B25J 9/1697; G05B 2219/39001; G05B 2219/45085
See application file for complete search history.

(56) References Cited

FOREIGN PATENT DOCUMENTS

| | | |
|---|---|---|
| CN | 115625711 | 1/2023 |
| CN | 116652958 | 8/2023 |
| CN | 117245649 | 12/2023 |
| JP | 2012011498 | 1/2012 |

OTHER PUBLICATIONS

"Written Opinion of the International Searching Authority (Form PCT/ISA/237) of PCT/CN2024/081064," mailed on May 4, 2024, pp. 1-4.

* cited by examiner

FORCE GUIDANCE TELEROBOTIC SYSTEM AND CONTROL METHOD BASED ON DUAL-ARM COLLABORATIVE POTENTIAL FIELD

CROSS-REFERENCE TO RELATED APPLICATION

This application is a continuation of international application of PCT application serial no. PCT/CN2024/081064 filed on Mar. 12, 2024, which claims the priority benefit of China application no. 202410208048.5 filed on Feb. 26, 2024. The entirety of each of the above-mentioned patent applications is hereby incorporated by reference herein and made a part of this specification.

TECHNICAL FIELD

The present disclosure belongs to the technical field of space teleoperation control, and mainly relates to a force guidance telerobotic system and control method based on a dual-arm collaborative potential field.

BACKGROUND

In recent years, teleoperation technology has been widely applied in complex and changeable environments, as well as diverse task requirements, such as deep-space exploration and deep-sea exploration, live-line power inspection, and operation and maintenance of nuclear and chemical facilities. Due to limited levels of robot control technology and sensor technology at present, it is difficult to develop a fully autonomous robot. Therefore, it is an inevitable trend to develop a telerobot to replace a human being in performing tasks in hazardous environments. A haptic device allows an operator to feel the force interaction between a robot and an environment during operation. Force feedback is an important means to enhance a sense of presence and transparency of a telerobotic system, and broaden dimensions of human-robot interaction.

However, since a mapping relationship between an operational space and a joint space of robotic arms with more than six degrees of freedom is neither explicit nor simple, and a wrist and an arm of the operator can form a coupling system, which affects movements between the wrist and the arm, it is often difficult for the operator to directly control an end tool of the robotic arm in a remote manner to reach desired position and posture, and position errors will inevitably arise during the operation. In recent years, virtual force guidance methods based on traditional virtual fixtures and an artificial potential field algorithm have become effective solutions to the above problems. However, the methods often only consider the operation of a single robotic arm, without considering the virtual force guidance methods for shared control of a telerobotic system with two robotic arms. Exhibiting a higher degree of freedom and excellent coordinated operation capabilities, a dual-arm robot is more flexible in performing complex tasks, such as handling and assembly, and has broader application prospects then the traditional single-arm robots. Correspondingly, the teleoperation control of dual-arm robot is more difficult, the operator often needs to be multitasking, and simultaneously control two robotic arms to complete coordinated tasks such as obstacle avoidance, target approaching, working posture adjustment, and dual-arm closed-loop coordinated movements, which impose physical and mental burden on the operator.

In addition, most of the current force guidance methods construct virtual fixtures based on a predefined structured environment, and are unsuitable for complex and dynamic unstructured environments, or some of the methods construct an attractive potential field and a repulsive potential field based on a parabolic function, in which case, resultant force of attractive force and repulsive force at ends of the robotic arms is zero, preventing it from reaching a target point. Moreover, most of the current force guidance methods give no consideration to the influence of a workspace of the robotic arm on the completion of task.

SUMMARY

In view of the deficiencies in the prior art, the present disclosure provides a force guidance telerobotic system and control method based on a dual-arm collaborative potential field. A real-time pose of a tool center point of each of the two robotic arms is obtained using a robotic arm kinematic model, and checking is performed in an iterative way to determine whether a shortest distance $d_{p-s,i}$ between a target object and a workspace boundary of each of the two robotic arms is lower than a threshold $D_s$; when the shortest distance is higher than the threshold, a dual-arm symmetric collaboration strategy will be adopted; when the shortest distance is lower than the threshold, the single-arm primary collaboration strategy will be adopted, and the arm will be designated as a primary arm; and a coordination factor $\delta_i$ of each of the two robotic arms is determined according to the collaboration strategy. The control method in the present disclosure determines the collaborative strategy based on environmental point cloud images, the pose information of the dual-arm end-effector center and the workspace of each of the two robotic arms, and dynamically updates the collaboration factor; the dual-arm collaborative potential field is constructed according to the collaboration factor, a distance between the target object and the tool center point of each of the two robotic arms, and a position of obstacle; the two haptic devices are used to assist an operator in controlling the two robotic arms to complete a dual-arm collaborative task based on the corresponding dynamic virtual constraint force generated by the dual-arm collaborative potential field, which can improve control accuracy, work efficiency, and safety factor of the operator during human-robot collaboration, therefore, the system can better adapt to a complex and unstructured environment.

In order to achieve the above objectives, the present disclosure provides a force guidance telerobotic system based on a dual-arm collaborative potential field, which includes two robotic arms, a haptic device, a router, a vision unit, a remote-site computer, a local-site computer, a display screen, and a mobile platform;

- the two robotic arms are respectively installed on the mobile platform and are connected to the remote-site computer;
- the haptic device is located on an operator console, connected to the remote-site computer via data cables, and configured to acquire a six-degree-of-freedom pose in a Cartesian coordinate system and to acquire control commands for the robotic arms, and to send the control commands to the local-site computer, as well as to receive dynamic virtual constraint force data generated by a dual-arm collaborative potential field force guidance control module algorithm from the local-site computer, and to feed the data to the operator;
- the router is configured to establish a local area network for an entire control system, enabling real-time data exchange between the robotic arms, the remote-site computer, the vision unit, the router, the local-site computer, and the haptic device;

the vision unit uses a structured light camera and is located on the mobile platform and installed between the two robotic arms, and the vision unit is connected to the remote-site computer and configured to acquire point cloud data of a surrounding environment of a robot in real-time and transmit the data to the local-site computer;

the remote-site computer is located inside the mobile platform and includes a robotic arm drive module, a mobile platform control module, a network communication module, and the remote-site computer further includes integration and communication functions of all the control modules;

the local-site computer is located beside the operator console and includes a haptic device drive module, a dual-arm collaborative potential field force guidance control module, a robotic arm kinematic model, a robotic arm dynamics model, a point cloud information processing module, and a network communication module, and the local-site computer further includes integration and communication functions of all the control modules;

the display screen is located directly in front of the operator console and is configured to show point cloud images and virtual constraint force data; and the mobile platform is configured to install the robotic arms, the vision unit and the remote-site computer.

In order to achieve the above objectives, the present disclosure further provides a force guidance telerobotic control method based on a dual-arm collaborative potential field, including the following steps:

S1. determining a workspace of each of the two robotic arms using a Monte Carlo method before an operation begins based on a dual-arm kinematic model, and solving and recording boundary coordinates of the workspace of each of the two robotic arms;

S2. acquiring environmental point cloud information, and segmenting point clouds based on image features; obtaining positions of an obstacle and a target object according to point cloud images, and determining position and attitude angle of a target point of each of the two robotic arms based on a point cloud bounding box shape of the target object by using a bounding box algorithm;

S3. obtaining a real-time pose of a tool center point of each of the two robotic arms using a robotic arm kinematic model, and checking in an iterative way to determine whether a shortest distance $d_{p\text{-}s,i}$ between a target object and a workspace boundary of each of the two robotic arms is lower than a threshold $D_s$:

when the shortest distance $d_{p\text{-}s,i}$ between the target object and the workspace of each of the two robotic arms boundary is higher than the threshold, a dual-arm symmetric collaboration strategy will be adopted, in which case, a coordination factor $\delta_i$ of each of the two robotic arms is 1;

when the shortest distance $d_{p\text{-}s,i}$ between the target object and a workspace of one robotic arm is lower than the threshold $D_s$, the robotic arm is taken as a primary arm, a single-arm primary collaboration strategy will be adopted, in which case, a collaboration factor of the primary arm is $\delta_1=0.5$, and a collaboration factor of the other robotic arm is $\delta_1=2$;

S4. constructing a dual-arm collaborative potential field based on a relative pose of the tool center point of each of the two robotic arms and the target point of each of the two robotic arms, generating virtual position attractive force $F_{a,i}(P_{t,i})$ through the haptic device, and guiding the operator to control an end tool of each of the two robotic arms to approach their respective target points;

S5. checking in an iterative way to determine whether the tool center point of each of the two robotic arms is approaching the obstacle; when the tool center point of each of the two robotic arms is approaching the obstacle, the system enters an obstacle avoidance phase, in which case, a repulsive potential field is constructed within a certain range outside a point cloud region of the obstacle, virtual repulsive force $F_{r,i,j}(d_{p,i\text{-}ob,j})$ is accordingly generated through the haptic device, the operator is assisted in controlling the robotic arms to avoid the obstacle in combination with the virtual position attractive force $F_{a,i}(P_{t,i})$; and when the tool center point of each of the two robotic arms is not approaching the obstacle, the step S4 is repeated;

S6. checking in an iterative way to determine whether the tool center point of each of the two robotic arms reaches a vicinity of the target point; when the tool reaches a vicinity of the target point, the system enters an operating pose adjustment phase, virtual posture attractive force $F_{z,i}(r_{t,i})$ is generated through the haptic device according to a relative pose angle between the end tool of each of the two robotic arms and the corresponding target point, virtual pose attractive force $F_{vr,i}$ is obtained in combination with the virtual position attractive force $F_{a,i}(P_{t,i})$ in the step S4, the operator is guided to accurately adjust an end pose of each of the two robotic arms to perform the operation; and when the tool center point of each of the two robotic arms does not reach the vicinity of the target point, the step S4 is repeated; and S7. checking in an iterative way to determine target object and start the coordinated movements; when the constraint relationship is formed, the two robotic arms are in a dual-arm closed-loop coordinated movement phase, relative poses between the tool center point of each of the two robotic arms are recorded and continuously updated, and a dual-arm relative impedance model is generated based on the dual-arm collaborative potential field, virtual relative impedance constraint force $F_{rc}(t)$ is generated through the haptic device, and the operator is assisted in controlling the two robotic arms to perform coordinated movements, such that relative positions of the end tools do not undergo a large sudden change and maintain synchronous movements.

As an improvement of the present disclosure, in the step S5, a method for determining whether the tool center point of each of the two robotic arms is approaching the obstacle is as follows: calculating a distance between coordinates of the tool center point of each of the two robotic arms $P_t$ and the obstacle $d_{p\text{-}ob}$, and determining where the distance is lower than an obstacle avoidance threshold $D_{ob}$; when the distance is lower than the obstacle avoidance threshold, the repulsive potential field is constructed;

in the step S6, a method for determining whether the tool center point of each of the two robotic arms reaches a vicinity of the target point is as follows: determining whether the tool center point of each of the two robotic arms P falls within the point cloud region of the target point, and both the virtual position attractive force and the virtual posture attractive force are generated in the point cloud region; and in the step S7, a method for determining target object and start the coordinated movements is as follows: determining whether the two robotic arms form an entirety with the target object and start the coordinated movements according to an open/close state of a gripper, and an intersection area between a point cloud profile of the gripper and a point cloud profile of the target object.

As an improvement of the present disclosure, the virtual position attractive force $F_{a,i}(P_{t,i})$ in the step S4, and the virtual repulsive force $F_{r,i,j}(d_{p,i\text{-}ob,j})$ in the step S5 are both three-dimension force, excluding torque; the virtual pose attractive force $F_{vr,i}$ in the step S6 is six-dimension force, including force and torque; and the virtual relative impedance constraint force $F_{rc}(t)$ in the step S7 is six-dimension force, including force and torque.

As an improvement of the present disclosure, in the step S5, a shortest distance $d_{p\text{-}ob}$ between the tool center point of each of the two robotic arms and the obstacle during the operation of the robot is calculated, with calculation principles as follows:

S51. assuming that coordinates of the tool center point of each of the two robotic arms are $P_t=(x_t,y_t,z_t)$, vertices of the bounding box model of the obstacle are denoted as $Q_i=(x_i,y_i,z_i)$, and distances $\lambda_1$ from $P_t$ to each of the vertices $Q_i$ of the bounding box is calculated; and $$\lambda_1=\sqrt{(x_t-x_i)^2+(y_t-y_i)^2+(z_t-z_i)^2}$$

S52. a vector $n_i$ of each edge of the bounding box is obtained, a vector $m_i$ from $P_t$ to each of the vertices is then calculated, and an angle between $n_i$ and $m_i$ is finally determined; when the angle is an obtuse angle, it will be discarded; and when the angle is an acute angle, a shortest distance $\lambda_2$ is calculated and obtained:

$$\lambda_2=\frac{|m_i\times n_i|}{|n_i|}$$

S53. three vertices $C_1$, $C_2$ and $C_3$ are taken on each face, a perpendicular foot from $P_t$ to the each face is set as $P_c=(x_c,y_c,z_c)$, a coordinate value of $P_c$ is calculated according to $P_tP_c\perp C_1C_2$, $P_tP_c\perp C_2C_3$ and $P_tP_c\perp C_1C_3$, the perpendicular foot is determined according to the vertices on the face, and a shortest distance $\lambda_3$ is finally calculated and obtained:

$$\lambda_3=\sqrt{(x_t-x_c)^2+(y_t-y_c)^2+(z_t-z_c)^2}$$

S54. a minimum value among $\lambda_1$, $\lambda_2$ and $\lambda_3$ is taken as the distance $d_{p\text{-}ob}$ from the tool center point of each of the two robotic arms to the obstacle:

$$d_{p\text{-}ob}=\min(\lambda_1,\lambda_2,\lambda_3).$$

As an improvement of the present disclosure, in the step S4, a calculation formula for the dual-arm collaborative potential field is as follows:

$$U_{a,i}(P_{t,i})=1-\exp\left(-\left(\frac{(D(P_{t,i},P_{o,i})-R_{t,i})^2}{2\delta_i^2}\right)\right),\ i=0,1$$

in the formula, $U_{a,i}(P_{t,i})$ represents the dual-arm collaborative potential field, $\delta_i$ represents a collaboration factor of an $i^{th}$ robotic arm in the dual-arm collaborative potential field, $D(P_{t,i},P_{o,i})=\sqrt{(x_{t,i}-x_{o,i})^2+(y_{t,i}-y_{o,i})^2+(z_{t,i}-z_{o,1})^2}$ represents a distance from the tool center point of each of the two robotic arms of the $i^{th}$ robotic arm to a corresponding target point, and $R_{t,i}$ represents a radius of a point cloud region of an $i^{th}$ target point;

a calculation formula for the virtual position attractive force $F_{a,i}(P_{t,i})$ is as follows:

$$F_{a,i}(P_{t,i})=\nabla U_{a,i}(P_{t,i})=\frac{(D(P_{t,i},P_{o,i})-R_{t,i})}{\delta_i^2}\exp\left(-\left(\frac{(D(P_{t,i},P_{o,i})-R_{t,i})^2}{2\delta_i^2}\right)\right),\ i=0,1$$

the above formula represents attractive force acting on the $i^{th}$ robotic arm, which is fed back to the operator through the virtual position attractive force generated by the haptic device.

As an improvement of the present disclosure, in the step S5, a calculation formula for the repulsive potential field is as follows:

$$U_{r,i,j}(d_{p,i-ob,j})=\begin{cases}\dfrac{1}{1+e^{-\varepsilon|d_{p,i-ob,j}|}}, & d_{p,i-ob,j}\le D_{ob,j}\\ 0, & d_{p,i-ob,j}>D_{ob,j}\end{cases},\ i=0,1;\ j=1,2$$

in the formula, $U_{r,j,i}(d_{p,i\text{-}ob,j})$ represents a repulsive potential field of a $j^{th}$ obstacle, $\varepsilon$ represents an adjustment factor of the repulsive potential field, $d_{p,i\text{-}ob,j}$ represents a distance from the $j^{th}$ obstacle to the tool center point the $i^{th}$ robotic arm, and $D_{ob,j}$ represents a repulsive potential field range of the $j^{th}$ obstacle;

a calculation formula for the virtual repulsive force is as follows:

$$F_{r,i,j}(d_{p,i-ob,j})=\nabla U_{r,i,j}(d_{p,i-ob,j})=\begin{cases}\dfrac{e^{-\varepsilon|d_{p,i-ob,j}|}}{\left(1+e^{-\varepsilon|d_{p,i-ob,j}|}\right)^2}, & d_{p,i-ob,j}\le D_{ob,j}\\ 0, & d_{p,i-ob,j}>D_{ob,j}\end{cases},\ i=0,1;\ j=1,2$$

the above formula represents repulsive force on the $i^{th}$ robotic arm imposed by the $j^{th}$ obstacle;

$$\sum_{j=1}^{n}F_{r,i,j}(d_{p,i-ob,j})$$

represents repulsive force on the $i^{th}$ robotic arm imposed by a total of n obstacles, which is fed back to the operator through the virtual repulsive force generated by the haptic device;

a calculation formula for the virtual constraint force an obstacle avoidance task of the $i^{th}$ robotic arm is as follows:

$$F_{p,i} = F_{a,i}(P_{t,i}) + \sum_{j=1}^{n} F_{r,i,j}(d_{p,i-ob,j}),\ i = 0, 1, ;\ j = 1, 2.$$

As an improvement of the present disclosure, in the step S6, a calculation formula for the virtual posture attractive force is as follows:

$$F_{z,i}(r_{t,i}) = Kre_i + B\dot{re}_i,\ i = 0, 1$$

in the formula, $re_i = r_{t,i} - r_{o,i}$ represents a relative posture between a posture angle $r_{t,i}$ of the $i^{th}$ robotic arm at time t and a posture angle $r_{o,i}$ of its corresponding target point, $\dot{re}_i$ represents a relative angular velocity between them, K represents a stiffness coefficient of a Kelvin-Voigt linear model, and B represents a damping coefficient of the Kelvin-Voigt linear model;

a calculation formula for six-dimension virtual posture attractive force received by the operator in precisely adjusting an end pose of each of the robotic arms is as follows:

$$F_{vr,i} = \begin{bmatrix} F_{a,i} \\ F_{z,i} \end{bmatrix},\ i = 0,1$$

in the formula, $F_{vr,i}$ is a 6×1 matrix, and both $F_{a,i}$ and $F_{z,i}$ are 3×1 matrices.

As an improvement of the present disclosure, in the step S7, calculation principles of the virtual relative impedance constraint force are as follows: the relative pose ce(0) of the tool center point of each of the two robotic arms when the two robotic arms form a closed-loop constraint is recorded and taken as an equilibrium position of the dual-arm relative impedance model; a relative pose $$ce(t) = \begin{bmatrix} x(t) \\ r(t) \end{bmatrix}$$

of the tool center point of each of the two robotic arms is updated in an iterative way, a difference between the relative pose and the equilibrium position is then calculated, and the difference is finally substituted into the dual-arm relative impedance model; and a calculation formula for the virtual relative impedance constraint force is as follows:

$$F_{rc}(t) = M_d\ddot{e}(t) + B_d\dot{e}(t) + k_d e(t)$$

in the formula, e(t)=ce(t)−ce(0) represents a difference between the relative position of the tool center point of each of the two robotic arms and the relative position ce(0) when the two robotic arms form the closed-loop constraint at the time t, where ce(t) is a 6×1 matrix, and both x(t) and r(t) are 3×1 matrices; and $M_d$, $B_d$ and $K_d$ are inertia, damping, and stiffness coefficient of the dual-arm relative impedance model.

Compared with the prior art, the present disclosure has the following beneficial effects:

(1) Compared with traditional artificial potential field methods, the dual-arm collaborative potential field function of the present disclosure solves the local optimum problem and provides better guidance performance.

(2) The control method in the present disclosure decomposes a dual-arm collaborative task into four stages: obstacle avoidance, target approaching, working posture adjustment, and dual-arm closed-loop coordinated movements. The corresponding dynamic virtual constraint force is generated for each stage based on the dual-arm collaborative potential field, which can improve control accuracy, work efficiency, and safety factor of the operator during human-robot collaboration, therefore, the system can better adapt to a complex and unstructured environment.

(3) The present disclosure takes into account the influence of the workspace of the robotic arm on the dual-arm collaborative strategy, and dynamically updates the collaboration factor to adjust the magnitude of attractive force generated by the dual-arm collaborative potential field, which aligns with the control characteristics of dual-arm collaboration, making it highly practical.

(4) The telerobotic system of the present disclosure has the advantages of as low latency, high precision, high stability, good safety, six-dimension force sensing and guidance, and the like. With dual-arm collaboration, the telerobotic system exhibits a high degree of freedom, and can complete more complex tasks and meet demands of practical applications well.

Figure 1:
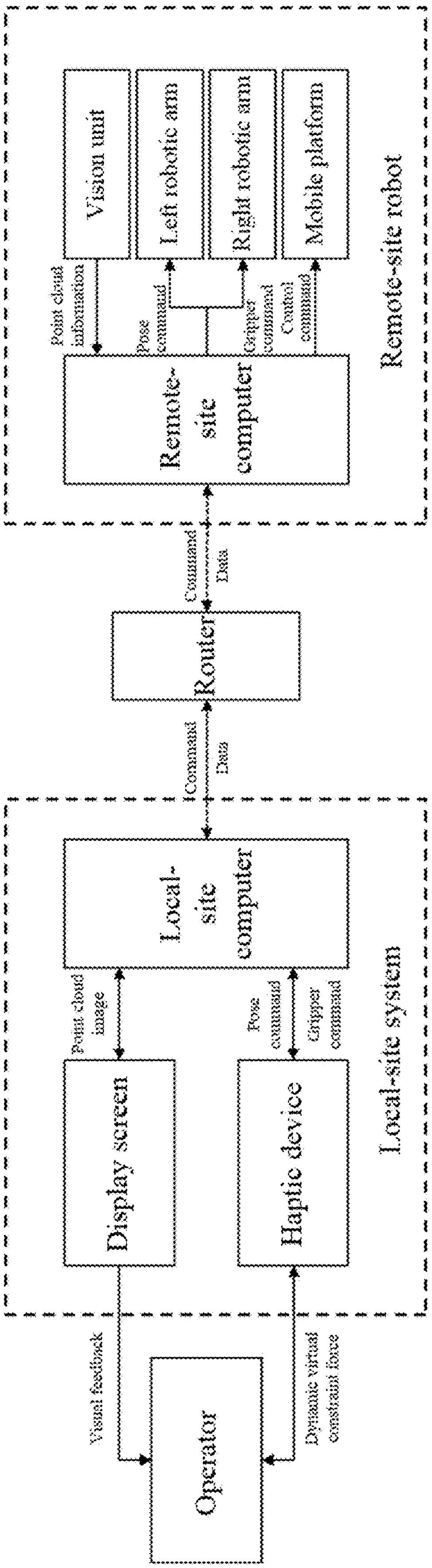
FIG. 1 is an overall block diagram of a force guidance telerobotic system and control method based on a dual-arm collaborative potential field according to the present disclosure.

Reference numerals of the accompanying drawings: 1. structured light camera; 2. mobile platform; 3. left robotic arm; 4. obstacle repulsive potential field range; 5. target point of each of the two robotic arms; 6. force guidance trajectory of each of the two robotic arms; 7. right robotic arm; 8. origin of the system world coordinate system; 9. dual-arm relative impedance mode; and 10. dual-arm closed-loop coordinated movement destination.

DETAILED DESCRIPTIONS OF THE EMBODIMENTS

The present disclosure will be further illustrated below with reference to the accompanying drawings and specific embodiments. It should be understood that the following specific embodiments are only used to illustrate the present disclosure, but are not intended to limit the scope of the present disclosure.

Embodiment 1

A force guidance telerobotic system based on a dual-arm collaborative potential field, as shown in FIG. 1, includes a left robotic arm 3, a right robotic arm 7, a haptic device, a router, a vision unit, a remote-site computer, a local-site computer, a display screen, and a mobile platform 2, where the left robotic arm 3 and the right robotic arm 7 are both six-degree-of-freedom robotic arms, and are respectively installed on the mobile platform 2 and are connected to the remote-site computer through a network cable, a working portion at an end of each of the two robotic arms can be a gripper, a suction cup, or other end tools capable of performing tasks, and the working portion at an end of each of the two robotic arms is connected to the remote-site computer through a data cable;

the haptic device uses two six-degree-of-freedom haptic devices, which are located on an operator console, are connected to the remote-site computer via data cables, and are configured to acquire a six-degree-of-freedom pose in a Cartesian coordinate system, control commands for end tools of the robotic arms, and to send the control commands to the local-site computer, as well as to receive dynamic virtual constraint force data generated by a dual-arm collaborative potential field force guidance control module algorithm from the local-site computer, and to feed the data to the operator, providing guidance and assistance to the operator;

the router is configured to establish a local area network for an entire control system, enabling real-time data exchange between the robotic arms, the remote-site computer, the vision unit, the router, the local-site computer, and the haptic device; and the remote-site computer and the local-site computers are connected to the router wirelessly to transmit control data, kinematic calculation data of robotic arms, and point cloud information acquired by the vision unit;

the vision unit uses a structured light camera 1 and is located on the mobile platform 2 and installed between the two robotic arms, is connected to the remote-site computer via a data cable, and is configured to acquire the point cloud information of a surrounding environment of the robot in real-time and transmit the data to the local-site computer;

the remote-site computer is located inside the mobile platform 2 and includes a robotic arm drive module, a mobile platform control module, a network communication module, and the remote-site computer further includes integration and communication functions of all the control modules;

the local-site computer is located beside the operator console and integrates a haptic device drive module, a dual-arm collaborative potential field force guidance control module, a robotic arm kinematic model, a robotic arm dynamics model, a point cloud information processing module, and a network communication module, and the local-site computer further includes integration and communication functions of all the control modules;

the display screen is located directly in front of the operator console and is configured to show point cloud images and virtual constraint force data; and the mobile platform 2 is configured to install the robotic arms, the vision unit and the remote-site computer.

When using the system of this embodiment, two collaboration strategies are available, that is, dual-arm symmetric collaboration and single-arm primary collaboration, the two strategies are determined based on pose information of tool center point of each of the two robotic arms, a target object position, and a workspace of each of the two robotic arms, and can be dynamically switched during operation of the robot according to different task scenarios;

1) the dual-arm symmetric collaboration means that when a distance from the target object to a boundary of the workspace of each of the two robotic arms is higher than a threshold value $D_s$, the two robotic arms should maintain synchronous movements and reach a target point 5 of each of the two robotic arms, in which case, a collaboration factor $\delta_i$ of each of the two robotic arms is 1; and 2) the single-arm primary collaboration means that when a shortest distance $d_{p\text{-}s,i}$ from the target object to a workspace boundary of each of the two robotic arms is lower than the threshold $D_s$, the arm should be designated as the primary arm; and the primary arm should first reach its target point and move the target object to a suitable position, such that the other arm can reach its target point, in which case, attractive force of the primary arm should be higher than that of the other arm, and a collaboration factor of the primary arm is $\delta_1=0.5$, and a collaboration factor of the other robotic arm is $\delta_1=2$.

The system of this embodiment determines the collaborative strategy based on environmental point cloud images, the pose information of the dual-arm end-effector center and the workspace of each of the two robotic arms, and dynamically updates the collaboration factor; the dual-arm collaborative potential field is constructed according to the collaboration factor, a distance between the target object and the tool center point of each of the two robotic arms, and a position of obstacle; the two haptic devices are used to assist the operator in controlling the two robotic arms to complete a dual-arm collaborative task based on the corresponding dynamic virtual constraint force generated by the dual-arm collaborative potential field, which can improve control accuracy, work efficiency, and safety factor of the operator during human-robot collaboration, therefore, the system can better adapt to a complex and unstructured environment. The telerobotic system of the present disclosure has the advantages of as low latency, high precision, high stability, good safety, six-dimension force sensing and guidance, and the like. With dual-arm collaboration, the telerobotic system exhibits a high degree of freedom, and can complete more complex tasks and meet demands of practical applications well.

Example 2

Figure 2:
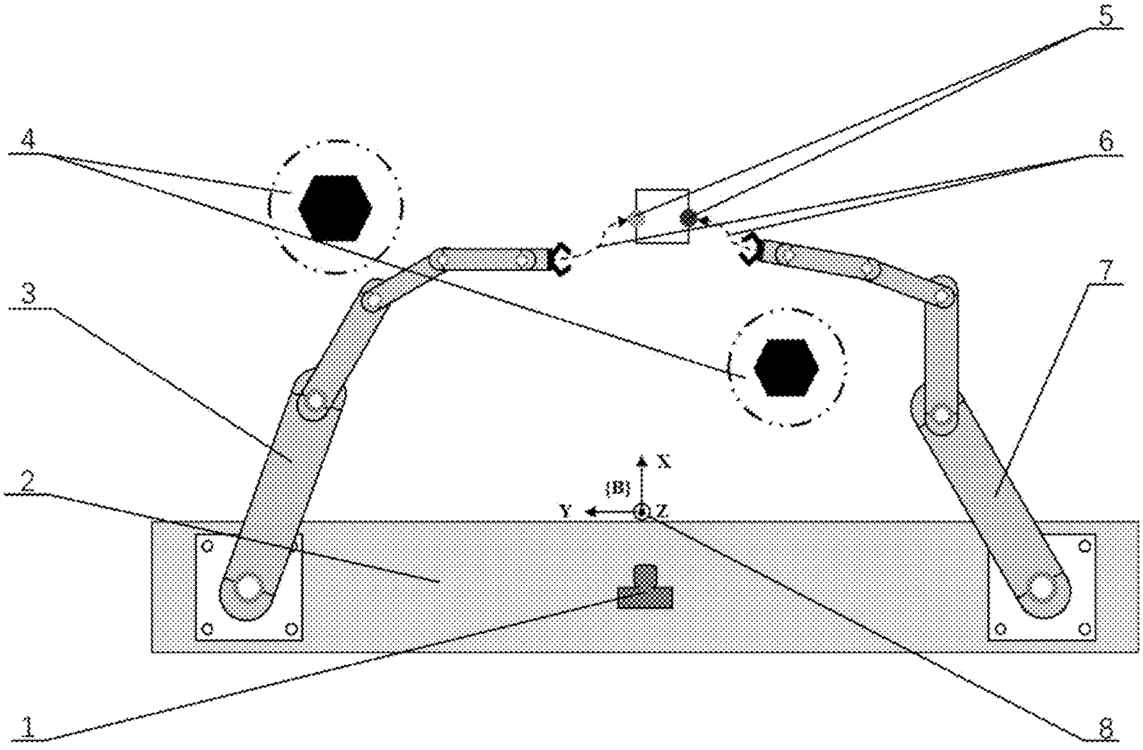
FIG. 2 is a schematic diagram of a force guidance telerobotic system and control method based on a dual-arm collaborative potential field in obstacle avoidance stage and target approaching stage according to a control method of the present disclosure.
Figure 3:
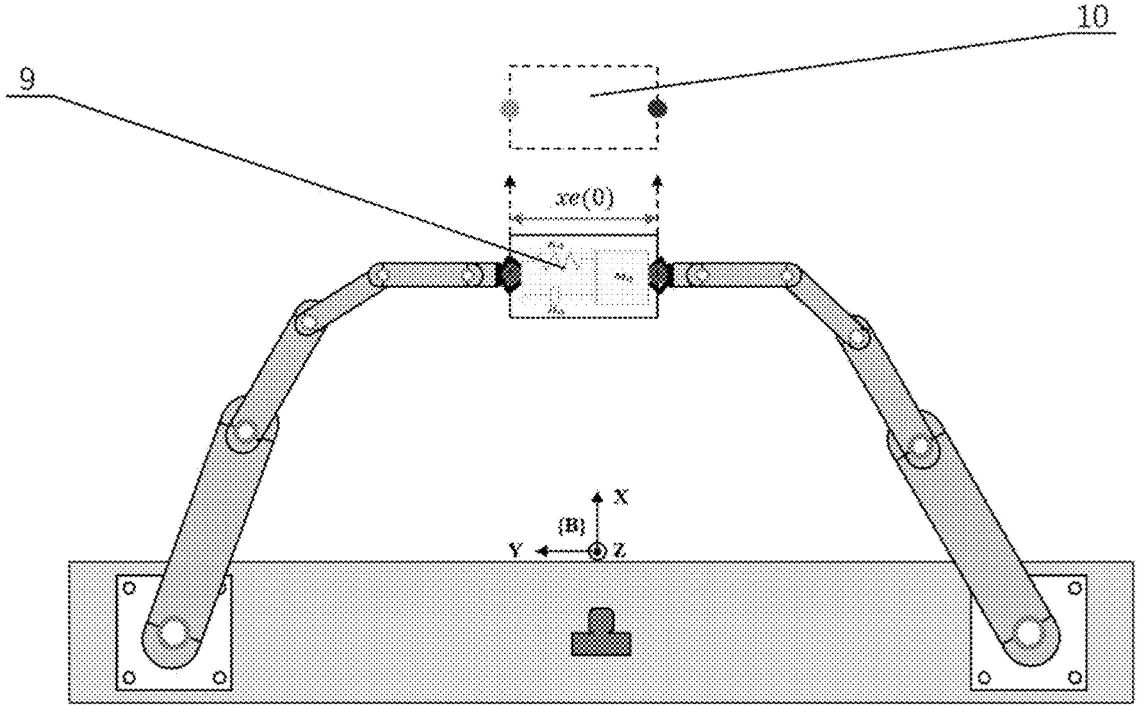
FIG. 3 is a schematic diagram of a force guidance telerobotic system and control method based on a dual-arm collaborative potential field in a dual-arm closed-loop coordinated movement stage according to a control method of the present disclosure.

A force guidance telerobotic control method based on a dual-arm collaborative potential field, the control method in this embodiment provides dynamic virtual constraint force to the operator based on a six-degree-of-freedom haptic device, where the six-degree-of-freedom haptic device can use a Force Dimension sigma.7 haptic device, and the control method mainly includes the following steps:

step S1: analyzing a workspace of each of the two robotic arms; specifically, determining a workspace of each of the two robotic arms using a Monte Carlo method before an operation begins based on a dual-arm kinematic model, and solving and recording boundary coordinates of the workspace of each of the two robotic arms; during the implementation of this embodiment, a Robotic Toolbox of MATLAB is used for kinematic simulation of the robotic arms to solve and record the boundary coordinates of the workspace of each of the two robotic arms;

step S2: acquiring and processing environmental point cloud information; specifically, acquiring the environmental point cloud information using a structured light camera 1, and segmenting point clouds based on image features; obtaining positions of an obstacle and a target object according to point cloud images, simplifying point cloud shapes of the obstacle and the target object by using a bounding box algorithm, and determining position and attitude angle of a target point 5 of each of the two robotic arms based on a point cloud bounding box shape of the target object;

step S3: determining a collaborative strategy and a collaboration factor; specifically, obtaining real-time poses of tool center points of the left robotic arm 3 and the right robotic arm 7 using a robotic arm kinematic model, and checking in an iterative way to determine whether a shortest distance $d_{p-s,i}$ between the target object and a workspace boundary of each of the two robotic arms is lower than a threshold $D_s$; when the shortest distance is higher than the threshold, a dual-arm symmetric collaboration strategy will be adopted; when the shortest distance is lower than the threshold, the single-arm primary collaboration strategy will be adopted, and the arm will be designated as a primary arm; and a coordination factor $\delta_i$ of each of the two robotic arms is determined according to the collaboration strategy;

In the specific implementation, two collaboration strategies are available, that is, dual-arm symmetric collaboration and single-arm primary collaboration, the two strategies are determined based on pose information of a tool center point of each of the two robotic arms, a target object position, and a workspace of each of the two robotic arms, and can be dynamically switched during operation of the robot according to different task scenarios;

1) the dual-arm symmetric collaboration means that when a distance from the target object to a boundary of the workspace of each of the two robotic arms is higher than a threshold value $D_s$, the two robotic arms should maintain synchronous movements and reach a target point 5 of each of the two robotic arms, in which case, a collaboration factor $\delta_i$ of each of the two robotic arms is 1; and 2) the single-arm primary collaboration mans that when a shortest distance $d_{p-s,i}$ from the target object to the workspace of each of the two robotic arms boundary is lower than the threshold $D_s$, the arm should be designated as the primary arm; and the primary arm should first reach its target point and move the target object to a suitable position, such that the other arm can reach its target point, in which case, attractive force of the primary arm should be higher than that of the other arm, and a collaboration factor of the primary arm is $\delta_1$=0.5, and a collaboration factor of the other robotic arm is $\delta_1$=2;

step S4: target approaching phase; specifically, constructing a dual-arm collaborative potential field based on a relative pose of the tool center point of each of the two robotic arms and the target point 5 of each of the two robotic arms, generating virtual position attractive force $F_{a,i}(P_{t,i})$ through the haptic device, and guiding the operator to control an end tool of each of the two robotic arms to approach their respective target points 5. In the implementation of this embodiment, a force guidance trajectory 6 of each of the two robotic arms is shown in FIG. 2;

step S5: obstacle avoidance phase; specifically, checking in an iterative way to determine whether the tool center point of each of the two robotic arms is approaching the obstacle; when the tool center point of each of the two robotic arms is approaching the obstacle, the system enters an obstacle avoidance phase, in which case, a repulsive potential field is constructed within a certain range outside a point cloud region to form an obstacle repulsive potential field range 4, virtual repulsive force $F_{r,i,j}(d_{p,i-ob,j})$ is accordingly generated through the haptic device, the operator is assisted in controlling the robotic arms to avoid the obstacle in combination with the virtual position attractive force $F_{a,i}(P_{t,i})$, and the force guidance trajectory 6 of each of the two robotic arms is shown in FIG. 2; and when the tool center point of each of the two robotic arms is not approaching the obstacle, the step S4 is repeated;

when determining whether the tool center point of each of the two robotic arms is approaching the obstacle involves calculating a distance $d_{p-ob}$ between coordinates of the tool center point of each of the two robotic arms $P_t$ and the obstacle, and determining where the distance is lower than an obstacle avoidance threshold $D_{ob}$; when the distance is lower than the obstacle avoidance threshold, the repulsive potential field is constructed. $d_{p-ob}$ is calculated and obtained using an obstacle bounding box algorithm;

step S6: operating pose adjustment phase; specifically, checking in an iterative way to determine whether the tool center point of each of the two robotic arms reaches a vicinity of the target point; when the tool reaches a vicinity of the target point, the system enters an operating pose adjustment phase, virtual posture attractive force is generated through the haptic device according to a relative pose angle between the end tool of each of the two robotic arms and the corresponding target point, the virtual pose attractive force $F_{z,i}(r_{t,i})$ is combined with the virtual position attractive force $F_{a,i}(P_{t,i})$ in the step S4 to obtain virtual pose attractive force $F_{vr,i}$, the operator is guided to accurately adjust an end pose of each of the two robotic arms to perform the operation; and when the tool center point of each of the two robotic arms does not reach the vicinity of the target point, the step S4 is repeated;

when determining whether the tool center point of each of the two robotic arms reaches a vicinity of the target point involves determining whether the tool center point of each of the two robotic arms P falls within the point cloud region of the target point, and both the virtual position attractive force and the virtual posture attractive force are generated in the point cloud region. The point cloud region of the target point is defined by a point cloud segmentation algorithm and is a spherical region with a point cloud centroid $P_o$ of the target point as a center, and a radius of the sphere is set as $R_t$;

step S7: dual-arm closed-loop coordinated movements; specifically, checking in an iterative way to determine target object and start the coordinated movements; when the constraint relationship is formed, the two robotic arms are in a dual-arm closed-loop coordinated movement phase, relative poses between the tool center point of each of the two robotic arms are recorded and continuously updated, and a dual-arm relative impedance model 9 is generated based on the dual-arm collaborative potential field, virtual relative impedance constraint force $F_{rc}(t)$ is generated through the haptic device, and the operator is assisted in controlling the two robotic arms to collaboratively move to a dual-arm closed-loop coordinated movement destination 10, such that relative positions of the end tools do not undergo a large sudden change and maintain synchronous movements. In the implementation of this embodiment, a force guidance trajectory of each of the two robotic arms is shown in FIG. 3;

when determining target object and start the coordinated movements according to involves that checking in an iterative way to determine whether the two robotic arms form an entirety with the target object and start the coordinated movements according to an open/close state of a gripper, and an intersection area between a point cloud profile of the gripper and a point cloud profile of the target object; and in the specific implementation, the position of the obstacle, the positions and attitude angles of the target object and the dual-arm target points, the positions of workspace boundaries of each of the two robotic arms, and the pose of poses of the tool center point of each of the two robotic arms are represented in a world coordinate system {B} through coordinate transformation by calculating all the poses, and the world coordinate system {B} conforms to a right-hand rule, as shown in FIG. 2, an origin of the system world coordinate system 8 is set as a reference point B on the mobile platform 2 of the robot.

In the specific implementation, the steps S4 and S5 are executed, actual task requirements are considered to reduce operation difficulty of the operator, the operator only needs to control the positions of the robotic arms, without considering the postures; the virtual position attractive force $F_{a,i}(P_{t,i})$ in the step S4, and the virtual repulsive force $F_{r,i,j}(d_{p,i\text{-}ob,j})$ in the step S5 are both three-dimension force, excluding torque. When performing the step S6, the operator can control both the positions and poses of the robotic arms when precisely adjusting the poses of the end tools, in which case, the virtual pose attractive force $F_{vr,i}$ is six-dimension force including force and torque; and when performing the step S7, the virtual relative impedance constraint force $F_{rc}(t)$ is six-dimension force including force and torque;

a calculation formula for the obstacle bounding box algorithm for the obstacle is as follows:

$$\Psi = \{L + \alpha l_x u_x + \beta l_y u_y + \gamma l_z u_z \mid \alpha, \beta, \gamma \in [-1,1]\}$$

in the formula, Ψ represents a mathematical model of the bounding box, L represents a 3D center vector of the bounding box, $l_x$, $l_y$ and $l_z$ represent half-side lengths of the bounding box, $u_x$、$u_y$、$u_z$ represents mutually perpendicular unit vectors of the bounding box, and α, β, γ are accuracy parameters of the bounding box algorithm;

a shortest distance $d_{p\text{-}ob}$ between the tool center point of each of the two robotic arms and the obstacle during the operation of the robot is calculated, with calculation principles as follows:

1) assuming that coordinates of the tool center point of each of the two robotic arms are $P_t=(x_t,y_t,z_t)$, vertices of the bounding box model of the obstacle are denoted as $Q_i=(x_i,y_i,z_i)$, and distances $\lambda_1$ from $P_t$ to each of the vertices $Q_i$ of the bounding box are calculated; and $$\lambda_1 = \sqrt{(x_t - x_i)^2 + (y_t - y_i)^2 + (z_t - z_i)^2}$$

2) distances from $P_t$ to each edge of the bounding box is then calculated. First, a vector $n_i$ of each edge of the bounding box is obtained, a vector $m_i$ from $P_t$ to each of the vertices is then calculated, and an angle between $n_i$ and $m_i$ is finally determined; when the angle is an obtuse angle, it will be discarded; and when the angle is an acute angle, a shortest distance $\lambda_2$ is calculated:

$$\lambda_2 = \frac{|m_i \times n_i|}{|n_i|}$$

3) distances from $P_t$ to each face of the bounding box is then calculated. Three vertices $C_1$, $C_2$ and $C_3$ are taken on each face, a perpendicular foot from $P_t$ to the each face is set as $P_c=(x_c,y_c,z_c)$, a coordinate value of $P_c$ is calculated according to $P_tP_c \perp C_1C_2$, $P_tP_c \perp C_2C_3$ and $P_tP_c \perp C_1C_3$, the perpendicular foot is determined according to the vertices on the face, and a shortest distance $\lambda_3$ is finally calculated and obtained:

$$\lambda_3 = \sqrt{(x_t - x_c)^2 + (y_t - y_c)^2 + (z_t - z_c)^2}$$

4) a minimum value among $\lambda_1$, $\lambda_2$ and $\lambda_3$ is taken as the distance $d_{p\text{-}ob}$ from the tool center point of each of the two robotic arms to the obstacle:

$$d_{p-ob} = \min(\lambda_1, \lambda_2, \lambda_3)$$

a calculation formula for the dual-arm collaborative potential field is as follows:

$$U_{a,i}(P_{t,i}) = 1 - \exp\left(-\left(\frac{(D(P_{t,i}, P_{o,i}) - R_{t,i})^2}{2\delta_i^2}\right)\right), i = 0,1$$

in the formula, $U_{a,i}(P_{t,i})$ represents the dual-arm collaborative potential field, $\delta_i$ represents a collaboration factor of an ith robotic arm in the dual-arm collaborative potential field, $D(P_{t,i},P_{o,i})=\sqrt{(x_{t,i}-x_{o,i})^2+(y_{t,i}-y_{o,i})^2+(z_{t,i}-z_{o,1})^2}$ represents a distance from the tool center point of the ith robotic arm to a corresponding target point, and $R_{t,i}$ represents a radius of a point cloud region of an ith target point;

a calculation formula for the virtual position attractive force $F_{a,i}(P_{t,i})$ is as follows:

$$F_{a,i}(P_{t,i}) = \nabla U_{a,i}(P_{t,i}) = \frac{(D(P_{t,i}, P_{o,i}) - R_{t,i})}{\delta_i^2}\exp\left(-\left(\frac{(D(P_{t,i}, P_{o,i}) - R_{t,i})^2}{2\delta_i^2}\right)\right), \quad i = 0,1$$

the above formula represents attractive force acting on the ith robotic arm, which is fed back to the operator through the virtual position attractive force generated by the haptic device;

a calculation formula for the repulsive potential field is as follows:

$$U_{r,i,j}(d_{p,i-ob,j}) = \begin{cases} \frac{1}{1+e^{-\varepsilon|d_{p-ob,j}|}}, & d_{p,i-ob,j} \le D_{ob,j} \\ 0, & d_{p,i-ob,j} > D_{ob,j} \end{cases}, \quad i = 0,1;\ j = 1,2\ \ldots$$

in the formula, $U_{r,j,i}(d_{p,i-ob,j})$ represents a repulsive potential field of a $j^{th}$ obstacle, ε represents an adjustment factor of the repulsive potential field, $d_{p,i-ob,j}$ represents a distance from the $j^{th}$ obstacle to the tool center point the $i^{th}$ robotic arm, and $D_{ob,j}$ represents a repulsive potential field range of the $j^{th}$ obstacle;

a calculation formula for the virtual repulsive force is as follows:

$$F_{r,i,j}(d_{p,i-ob,j}) = \nabla U_{r,i,j}(d_{p,i-ob,j}) = \begin{cases} \frac{e^{-\varepsilon|d_{p-ob,j}|}}{(1+e^{-\varepsilon|d_{p-ob,j}|})^2}, & d_{p,i-ob,j} \le D_{ob,j} \\ 0, & d_{p,i-ob,j} > D_{ob,j} \end{cases}$$

$$i = 0,1;\ j = 1,2\ \ldots$$

the above formula represents repulsive force on the $i^{th}$ robotic arm imposed by the $j^{th}$ obstacle;

$$\sum_{j=1}^{n} F_{r,i,j}(d_{p,i-ob,j})$$

represents repulsive force on the $i^{th}$ robotic arm imposed by a total of n obstacles, which is fed back to the operator through the virtual repulsive force generated by the haptic device;

a calculation formula for the virtual constraint force an obstacle avoidance task of the $i^{th}$ robotic arm is as follows:

$$F_{p,i} = F_{a,i}(P_{t,i}) + \sum_{j=1}^{n} F_{r,i,j}(d_{p,i-ob,j}),\ i = 0,1;\ j = 1,2\ \ldots$$

a calculation formula for the virtual posture attractive force is as follows:

$$F_{z,i}(r_{t,i}) = Kre_i + B\dot{re}_t,\ i = 0,1$$

in the formula, $re_i = r_{t,i} - r_{o,i}$ represents a relative posture between a posture angle $r_{t,i}$ of the $i^{th}$ robotic arm at time t and a posture angle $r_{o,i}$ of its corresponding target point, $\dot{re}_t$ represents a relative angular velocity between them, K represents a stiffness coefficient of a Kelvin-Voigt linear model, and B represents a damping coefficient of the Kelvin-Voigt linear model;

a calculation formula for six-dimension virtual posture attractive force received by the operator in precisely adjusting an end pose of each of the robotic arms is as follows:

$$F_{vr,i} = \begin{bmatrix} F_{a,i} \\ F_{z,i} \end{bmatrix},\ i = 0,1$$

in the formula, $F_{vr,i}$ is a 6×1 matrix, and both $F_{a,i}$ and $F_{z,i}$ are 3×1 matrices;

calculation principles of the virtual relative impedance constraint force are as follows: the relative pose ce(0) of the tool center point of each of the two robotic arms when the two robotic arms form a closed-loop constraint is recorded and taken as an equilibrium position of the dual-arm relative impedance model 9; a relative pose $$ce(t) = \begin{bmatrix} x(t) \\ r(t) \end{bmatrix}$$

of the tool center point of each of the two robotic arms is updated in an iterative way, a difference between the relative pose and the equilibrium position is then calculated, the difference is finally substituted into the dual-arm relative impedance model 9; and a calculation formula for the virtual relative impedance constraint force is as follows:

$$F_{rc}(t) = M_d\ddot{e}(t) + B_d\dot{e}(t) + k_d e(t)$$

in the formula, e(t)=ce(t)−ce(0) represents a difference between the relative position of the tool center point of each of the two robotic arms and the relative position ce(0) when the two robotic arms form the closed-loop constraint at the time t, where ce(t) is a 6×1 matrix, and both x(t) and r(t) are 3×1 matrices; $M_d$, $B_d$ and $K_d$ are inertia, damping, and stiffness coefficient of the dual-arm relative impedance model 9; and when the relative poses of the two robotic arms changes, the virtual relative impedance constraint force is generated through the haptic device and fed back to the operator, such that the operator can maintain synchronized movements of both robotic arms to the dual-arm closed-loop coordinated movement destination 10.

In summary, the present disclosure considers the characteristics of dual-arm collaborative tasks and determines the collaboration strategy based on the environmental point cloud images, the pose information of the tool center point of each of the two robotic arms, and the workspaces of the two robotic arms. The collaboration factors are dynamically updated, and the dual-arm collaborative potential field is designed accordingly. The virtual constraint force is generated in combination with the repulsive force potential field, the virtual posture attractive force, and the dual-arm relative impedance model, and the operator can be assisted in controlling the two robotic arms to complete a dual-arm collaborative task, which can improve control accuracy, work efficiency, and safety factor of the operator during human-robot collaboration, therefore, the system can better adapt to a complex and unstructured environment.

In the description of the present disclosure, reference to terms "one embodiment", "examples", "specific examples", and the like means that a specific feature, structure, material or characteristic described in combination with the embodiment are included in at least one embodiment or example of the present disclosure. In the description, the schematic descriptions of the above terms do not necessarily refer to the same embodiment or example. Moreover, the specific feature, structure, material or characteristics described may be combined in a suitable manner in any one or more embodiments or examples.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What is claimed is:

1. A force guidance telerobotic system based on a dual-arm collaborative potential field, comprising two robotic arms, a haptic device, a router, a vision unit, a remote-site computer, a local-site computer, a display screen, and a mobile platform;

the two robotic arms are respectively installed on the mobile platform and are connected to the remote-site computer;

the haptic device is located on an operator console, connected to the remote-site computer via data cables, and configured to acquire a six-degree-of-freedom pose in a Cartesian coordinate system and to acquire control commands for the robotic arms, and to send the control commands to the local-site computer, as well as to receive dynamic virtual constraint force data generated by a dual-arm collaborative potential field force guidance control module algorithm from the local-site computer, and to feed the data to an operator;

the router is configured to establish a local area network for an entire control system, enabling real-time data exchange between the robotic arms, the remote-site computer, the vision unit, the router, the local-site computer, and the haptic device;

the vision unit uses a structured light camera and is located on the mobile platform and installed between the two robotic arms, and the vision unit is connected to the remote-site computer and configured to acquire point cloud data of a surrounding environment of a robot in real-time and transmit the data to the local-site computer;

the remote-site computer is located inside the mobile platform and comprises a robotic arm drive module, a mobile platform control module, a network communication module, and the remote-site computer further comprises integration and communication functions of all control modules;

the local-site computer is located beside the operator console and comprises a haptic device drive module, a dual-arm collaborative potential field force guidance control module, a robotic arm kinematic model, a robotic arm dynamics model, a point cloud information processing module, and a network communication module, and the local-site computer further comprises integration and communication functions of all control modules;

the display screen is located directly in front of the operator console and is configured to show point cloud images and virtual constraint force data; and the mobile platform is configured to install the robotic arms, the vision unit and the remote-site computer, wherein the force guidance telerobotic system is configured to perform the following steps:

S1. determining a workspace of each of the two robotic arms using a Monte Carlo method before an operation begins based on a dual-arm kinematic model, and solving and recording boundary coordinates of the workspace of each of the two robotic arms;

S2. acquiring environmental point cloud information and segmenting point clouds based on image features; obtaining positions of an obstacle and a target object according to point cloud images, and determining position and attitude angle of a target point of each of the two robotic arms based on a point cloud bounding box shape of the target object by using a bounding box algorithm; and S3. obtaining a real-time pose of a tool center point of each of the two robotic arms using a robotic arm kinematic model, and checking in an iterative way to determine whether a shortest distance $d_{p\text{-}s,i}$ between the target object and a workspace boundary of each of the two robotic arms is lower than a threshold $D_s$:

when the shortest distance $d_{p\text{-}s,i}$ between the target object and the workspace of each of the two robotic arms boundary is higher than the threshold, a dual-arm symmetric collaboration strategy will be adopted, in which case, a coordination factor $\delta_i$ of the left and right robotic arms is 1; and when the shortest distance $d_{p\text{-}s,i}$ between the target object and a workspace of a first robotic arm of the robotic arms is lower than the threshold $D_s$, the first robotic arm is taken as a primary arm, a single-arm primary collaboration strategy will be adopted, in which case, a collaboration factor of the primary arm is $\delta_1=0.5$, and a collaboration factor of the other robotic arm is $\delta_1=2$;

S4. constructing a dual-arm collaborative potential field based on a relative pose of the tool center point of each of the two robotic arms and the target point of each of the two robotic arms, generating a virtual position attractive force $F_{a,i}(P_{t,i})$ through the haptic device, and guiding the operator to control an end tool of each of the two robotic arms to approach their respective target points;

S5. checking in the iterative way to determine whether the tool center point of each of the two robotic arms is approaching the obstacle; when the tool center point of each of the two robotic arms is approaching the obstacle, the system enters an obstacle avoidance phase, in which case, a repulsive potential field is constructed within a certain range outside a point cloud region of the obstacle, virtual repulsive force $F_{r,ij}(d_{p,i\text{-}ob,j})$, is accordingly generated through the haptic device, the operator is assisted in controlling the robotic arms to avoid the obstacle in combination with the virtual position attractive force $F_{a,i}(P_{t,i})$; and when the tool center point of each of the two robotic arms is not approaching the obstacle, the step S4 is repeated;

S6. checking in the iterative way to determine whether the tool center point of each of the two robotic arms reaches a vicinity of the target point; when the tool reaches the vicinity of the target point, the system enters an operating pose adjustment phase, a virtual posture attractive force $F_{z,i}(r_{t,i})$ is generated through the haptic device according to a relative pose angle between the end tool of each of the two robotic arms and the corresponding target point, virtual pose attractive force $F_{vr,i}$ is obtained in combination with the virtual position attractive force $F_{a,i}(P_{t,i})$ in the step S4, the operator is guided to accurately adjust an end pose of each of the two robotic arms to perform the operation; and when the tool center point of each of the two robotic arms does not reach the vicinity of the target point, the step S4 is repeated; and S7. checking in the iterative way to determine the target object and start the coordinated movements; when the constraint relationship is formed, the two robotic arms are in a dual-arm closed-loop coordinated movement phase, relative poses between the tool center point of each of the two robotic arms are recorded and continuously updated, and a dual-arm relative impedance model is generated based on the dual-arm collaborative potential field, virtual relative impedance constraint force $F_{rc}(t)$ is generated through the haptic device, and the operator is assisted in controlling the two robotic arms to perform coordinated movements, such that relative positions of the end tools do not undergo a large sudden change and maintain synchronous movements.

2. The force guidance telerobotic system based on the dual-arm collaborative potential field according to claim 1, wherein in the step S5, a method for determining whether the tool center point of each of the two robotic arms is approaching the obstacle is as follows: calculating a distance between coordinates of the tool center point of each of the two robotic arms $P_t$ and the obstacle $d_{p\text{-}ob}$, and determining whether the distance is lower than an obstacle avoidance threshold $D_{ob}$; when the distance is lower than the obstacle avoidance threshold, the repulsive potential field is constructed;

in the step S6, a method for determining whether the tool center point of each of the two robotic arms reaches the vicinity of the target point is as follows: determining whether the tool center point of each of the two robotic arms P falls within the point cloud region of the target point, and both the virtual position attractive force and the virtual posture attractive force are generated in the point cloud region; and in the step S7, a method for determining the target object and start the coordinated movements is as follows: determining whether the two robotic arms form an entirety with the target object and start the coordinated movements according to an open/close state of a gripper, and an intersection area between a point cloud profile of the gripper and a point cloud profile of the target object.

3. The force guidance telerobotic system based on the dual-arm collaborative potential field according to claim 2, wherein the virtual position attractive force $F_{a,i}(P_{t,i})$ in the step S4, and the virtual repulsive force $F_{r,i,j}(d_{p,i\text{-}ob,j})$ in the step S5 are both three-dimension force, excluding torque; the virtual pose attractive force $F_{vr,i}$ in the step S6 is six-dimension force, comprising force and torque; and the virtual relative impedance constraint force $F_{rc}(t)$ in the step S7 is six-dimension force, comprising force and torque.

4. The force guidance telerobotic system based on the dual-arm collaborative potential field according to claim 2, wherein in the step S5, a shortest distance $d_{p\text{-}ob}$ between the tool center point of each of the two robotic arms and the obstacle during the operation of the robot is calculated, with calculation principles as follows:

S51. assuming that coordinates of the tool center point of each of the two robotic arms are $P_t=(x_t,y_t,z_t)$, vertices of the bounding box model of the obstacle are denoted as $Q_i=(x_i,y_i,z_i)$, and distances $\lambda_1$ from $P_t$ to each of the vertices $Q_i$ of the bounding box are calculated;

$$\lambda_1 = \sqrt{(x_t - x_i)^2 + (y_t - y_i)^2 + (z_t - z_i)^2}$$

S52. a vector $n_i$ of each edge of the bounding box is obtained, a vector $m_i$ from $P_t$ to each of the vertices is then calculated, and an angle between $n_i$ and $m_i$ is finally determined; when the angle is an obtuse angle, it will be discarded; and when the angle is an acute angle, a shortest distance $\lambda_2$ is calculated and obtained:

$$\lambda_2 = \frac{|m_i \times n_i|}{|n_i|}$$

S53. three vertices $C_1$, $C_2$ and $C_3$ are taken on each face, a perpendicular foot from $P_t$ to the each face is set as $P_c=(x_c,y_c,z_c)$, a coordinate value of $P_c$ is calculated according to $P_tP_c \perp C_1C_2$, $P_tP_c \perp C_2C_3$ and $P_tP_c \perp C_1C_3$, the perpendicular foot is determined according to the vertices on the face, and a shortest distance $\lambda_3$ is finally calculated and obtained:

$$\lambda_3 = \sqrt{(x_t - x_c)^2 + (y_t - y_c)^2 + (z_t - z_c)^2}$$

S54. a minimum value among $\lambda_1$, $\lambda_2$ and $\lambda_3$ is taken as the distance $d_{p\text{-}ob}$ from the tool center point of each of the two robotic arms to the obstacle:

$$d_{p-ob} = \min(\lambda_1, \lambda_2, \lambda_3).$$

5. The force guidance telerobotic system based on the dual-arm collaborative potential field according to claim 4, wherein in the step S4, a calculation formula for the dual-arm collaborative potential field is as follows:

$$U_{a,i}(P_{t,i}) = 1 - \exp\left(-\left(\frac{(D(P_{t,i}, P_{o,i}) - R_{t,i})^2}{2\delta_i^2}\right)\right), \; i = 0, 1,$$

in the formula, $U_{a,i}(P_{t,i})$ represents the dual-arm collaborative potential field, $\delta_i$ represents a collaboration factor of an ith robotic arm in the dual-arm collaborative potential field, $D(P_{t,i}, P_{t,i}) = \sqrt{(x_{t,i}-x_{o,i})^2+(y_{t,i}-y_{o,i})^2+(z_{t,i}-z_{o,1})^2}$ represents a distance from the tool center point of the ith robotic arm to a corresponding target point, and $R_{t,i}$ represents a radius of the point cloud region of an ith target point;

a calculation formula for the virtual position attractive force $F_{a,i}(P_{t,i})$ is as follows:

$$F_{a,i}(P_{t,i}) = \nabla U_{a,i}(P_{t,i}) = \frac{(D(P_{t,i}, P_{o,i}) - R_{t,i})}{\delta_i^2} \exp\left(-\left(\frac{(D(P_{t,i}, P_{o,i}) - R_{t,i})^2}{2\delta_i^2}\right)\right), \; i = 0, 1$$

the above formula represents attractive force acting on the ith robotic arm, which is fed back to the operator through the virtual position attractive force generated by the haptic device.

6. The force guidance telerobotic system based on the dual-arm collaborative potential field according to claim 5, wherein in the step S5, a calculation formula for the repulsive potential field is as follows:

$$U_{r,i,j}(d_{p,i-ob,j}) = \begin{cases} \frac{1}{1+e^{-\varepsilon|d_{p,i-ob,j}|}}, & d_{p,i-ob,j} \le D_{ob,j} \\ 0, & d_{p,i-ob,j} > D_{ob,j} \end{cases}, \ i = 0, 1; \ j = 1, 2 \ \ldots$$

in the formula, $U_{r,j,i}(d_{p,i-ob,j})$ represents a repulsive potential field of a $j^{th}$ obstacle, ε represents an adjustment factor of the repulsive potential field, $d_{p,i-ob,j}$ represents a distance from the $j^{th}$ obstacle to the tool center point of the $i^{th}$ robotic arm, and $D_{ob,j}$ represents a repulsive potential field range of the $j^{th}$ obstacle;

a calculation formula for the virtual repulsive force is as follows:

$$F_{r,i,j}(d_{p,i-ob,j}) = \nabla U_{r,i,j}(d_{p,i-ob,j}) = \begin{cases} \frac{e^{-\varepsilon|d_{p,i-ob,j}|}}{\left(1+e^{-\varepsilon|d_{p,i-ob,j}|}\right)^2}, & d_{p,i-ob,j} \le D_{ob,j} \\ 0, & d_{p,i-ob,j} > D_{ob,j} \end{cases},$$

$$i = 0, 1; \ j = 1, 2 \ \ldots$$

the above formula represents repulsive force on the $i^{th}$ robotic arm imposed by the $j^{th}$ obstacle;

$$\sum_{j=1}^{n} F_{r,i,j}(d_{p,i-ob,j})$$

represents repulsive force on the $i^{th}$ robotic arm imposed by a total of n obstacles, which is fed back to the operator through the virtual repulsive force generated by the haptic device;

a calculation formula for the virtual constraint force an obstacle avoidance task of the $i^{th}$ robotic arm is as follows:

$$F_{p,i} = F_{a,i}(P_{t,i}) + \sum_{j=1}^{n} F_{r,i,j}(d_{p,i-ob,j}), \ i = 0, 1; \ j = 1, 2 \ \ldots .$$

7. The force guidance telerobotic system based on the dual-arm collaborative potential field according to claim 6, wherein in the step S6, a calculation formula for the virtual posture attractive force is as follows:

$$F_{z,i}(r_{t,i}) = Kre_i + B\dot{re}_i, \ i = 0, 1$$

in the formula, $re_i = r_{t,i} - r_{o,i}$ represents a relative posture between a posture angle $r_{t,i}$ of the $i^{th}$ robotic arm at time t and a posture angle $r_{o,i}$ of its corresponding target point, $\dot{re}_i$ represents a relative angular velocity between them, K represents a stiffness coefficient of a Kelvin-Voigt linear model, and B represents a damping coefficient of the Kelvin-Voigt linear model;

a calculation formula for six-dimension virtual posture attractive force received by the operator in precisely adjusting an end pose of each of the robotic arms is as follows:

$$F_{vr,i} = \begin{bmatrix} F_{a,i} \\ F_{z,i} \end{bmatrix}, \ i = 0, 1$$

in the formula, $F_{vr,i}$ is a 6×1 matrix, and both $F_{a,i}$ and $F_{z,i}$ are 3×1 matrices.

8. The force guidance telerobotic system based on the dual-arm collaborative potential field according to claim 7, wherein in the step S7, calculation principles of the virtual relative impedance constraint force are as follows: the relative pose ce(0) of the tool center point of each of the two robotic arms when the two robotic arms form a closed-loop constraint is recorded and taken as an equilibrium position of the dual-arm relative impedance model; a relative pose $$ce(t) = \begin{bmatrix} x(t) \\ r(t) \end{bmatrix}$$

of the tool center point of each of the two robotic arms is updated in the iterative way, a difference between the relative pose and the equilibrium position is then calculated, and the difference is finally substituted into the dual-arm relative impedance model; and a calculation formula for the virtual relative impedance constraint force is as follows:

$$F_{rc}(t) = M_d\ddot{e}(t) + B_d\dot{e}(t) + k_d e(t)$$

in the formula, e(t)=ce(t)−ce(0) represents a difference between the relative position of the tool center point of each of the two robotic arms and the relative position ce(0) when the two robotic arms form the closed-loop constraint at the time t, wherein ce(t) is a 6×1 matrix, and both x(t) and r(t) are 3×1 matrices; and $M_d$, $B_d$ and $K_d$ are inertia, damping, and stiffness coefficient of the dual-arm relative impedance model.

* * * * *